(12) United States Patent
Smith

(10) Patent No.: US 6,299,042 B1
(45) Date of Patent: Oct. 9, 2001

(54) TOURING BAG SUPPORT FOR MOTORCYCLES

(76) Inventor: Charles E. Smith, 317 Northford Ct., Brandon, MS (US) 39047

( * ) Notice: Subject to any disclaimer, the term of this patent is extended or adjusted under 35 U.S.C. 154(b) by 0 days.

(21) Appl. No.: 09/546,284

(22) Filed: Apr. 10, 2000

(51) Int. Cl.[7] ................................. B62J 7/04; B62J 7/08
(52) U.S. Cl. .................... 224/431; 224/413; 224/450; 224/452; 224/455; 224/460; 224/463; 224/901.8
(58) Field of Search .................................. 224/413, 419, 224/428, 430, 431, 450–455, 459, 460, 463, 901.8

(56) References Cited

U.S. PATENT DOCUMENTS

| | | |
|---|---|---|
| 3,921,868 | 11/1975 | Reichbach . |
| 4,353,490 * | 10/1982 | Jacjson et al. .................... 224/452 X |
| 4,480,773 * | 11/1984 | Krauser ............................. 224/452 X |
| 4,562,944 * | 1/1986 | Jackson et al. .................... 224/452 X |
| 4,580,706 * | 4/1986 | Jackson et al. .................... 224/463 X |
| 4,588,114 | 5/1986 | Lebaron et al. . |
| 4,760,943 | 8/1988 | Bass et al. . |
| 4,974,765 | 12/1990 | Marchetto et al. . |
| 4,981,243 * | 1/1991 | Rogowski ........................ 224/454 X |
| 5,065,922 * | 11/1991 | Harris ............................. 224/901.8 X |
| 5,251,796 | 10/1993 | Shelhart . |
| 5,443,192 * | 8/1995 | Hodges et al. ................. 224/901.8 X |
| 5,931,361 * | 8/1999 | Schwimmer .......................... 224/453 |
| 6,029,875 * | 2/2000 | Johnston ........................... 224/460 X |

* cited by examiner

Primary Examiner—Gregory M. Vidovich
(74) Attorney, Agent, or Firm—Jacobson Holman, PLLC

(57) ABSTRACT

A touring bag support is secured on top of a motorcycle luggage rack. A touring bag is secured to the support in a variety of ways. The bottom of the touring bag remains flat and stable on the support because the support is longer and wider than the touring bag and the motorcycle luggage rack. A plurality of slots on an outer perimeter of the support allow for easy attachment of the touring bag to the support by bungee cords and straps. The touring bag support provides a safe, stable load on the rear of the motorcycle. Further, an overall neat, aesthetically pleasing appearance is also provided.

19 Claims, 3 Drawing Sheets

TOURING BAG SUPPORT FOR MOTORCYCLES

FIELD OF THE INVENTION

The present invention relates to the field of a touring bag support to be mounted on a luggage rack of a motorcycle for supporting a motorcycle touring bag in a fully supported manner.

BACKGROUND OF THE INVENTION

With the ever increasing popularity of motorcycles, many novice or amateur riders are becoming involved in the use of motorcycles as a hobby. Oftentimes, a novice motorcyclist is more interested in accessorizing their motorcycle than operating the motorcycle in a safe manner.

For instance, touring bags for motorcycles are used to pack clothing and other necessities for around town or extended trips. The manufacturer of the touring bag usually suggests a load of not more than ten pounds to be placed in the touring bag. It is also usually stressed by the manufacturer that the load in the touring bag be even and balanced.

However, oftentimes, the touring bag is larger than the luggage rack provided or installed on the motorcycle. Also, the advice to limit the load to ten pounds is oftentimes ignored.

The maintaining of a load in a motorcycle touring bag in a balanced and safe position is often difficult to do when attaching the touring bag directly to the motorcycle luggage rack due to the small size of the luggage rack in comparison to the size of the touring bag. The touring bag usually sags over the sides and the rear of the luggage rack.

When riding on bumpy roads, for example, the load in the touring bag is caused to shift. A suddenly shifted load in a touring bag presents an unexpected danger when cornering or driving at fast rates of speeds. The shifting load or an unbalanced load can change the operating conditions of the motorcycle unexpectedly. The sudden shift in the center of gravity of the motorcycle can catch the driver off guard and Cause an overturning of the motorcycle by the momentum of the shifting load. Needless to say, this is an extremely dangerous situation.

SUMMARY OF THE INVENTION

It is therefore an object of the present invention to is provide a touring bag support which is secured on top of a motorcycle luggage rack. A touring bag is secured to the support in a variety of ways. The bottom of the touring bag remains flat and stable on the support because the support is longer and wider than the touring bag and the motorcycle luggage rack.

A plurality of slots on an outer perimeter of the support allow for easy attachment of the touring bag to the support by bungee cords and straps. The touring bag support of the present invention provides a safe, stable load on the rear of the motorcycle. Further, an overall neat, aesthetically pleasing appearance is also provided.

The touring bag support of the present invention is made of rigid plastic or other rigid material. The overall dimensions of the support are approximately eleven inches wide by approximately nineteen inches long. Centrally located on the support are a plurality of openings for use in securing the support to a luggage rack of a motorcycle. Spaced about the periphery of the support are additional openings of various sizes for securing the support to a "sissy bar" of the motorcycle and for securing a touring bag to the support.

The support is secured to the motorcycle luggage rack by wrapping a plurality of loop portions of a hook and loop fastener, such as VELCRO, around the bars of a luggage rack and through the openings in the central portion of the support. Permanently secured on an upper surface of the support are several loop portions of a hook and loop fastener. The loop portions of the hook and loop fasteners are passed around the bars of a motorcycle luggage rack, and through the openings in the central portion of the support to secure the hook portions to the loop portions.

A series of narrow slots, two each on both sides and a front edge portion of the support, are used for securing one end of a bungee cord. The opposite end of the bungee cord is used to secure the touring bag to the support. Preferably, a D-ring spaced along a seam on the touring bag receives the opposite end of the bungee cords for a secure connection between the touring bag and the support.

Two slot openings in the rear edge portion of the support are used for attaching touring bag straps which are secured to the touring bag, to the support. The touring bag straps have a buckle and clip fastener. The clip on a strap passes through the openings at the rear edge portion of the support and wrap around the support to reconnect to the buckle secured to the touring bag. The two openings at the rear edge portion of the support provide an easy access location for anchoring the touring bag straps to the support as compared to the difficult connection (due to their location) of the touring bag straps to a "sissy bar" or the luggage rack as was previously done.

Accordingly, it is another object of the present invention to provide a touring bag support to be mounted on a luggage rack of a motorcycle by a hook and loop fastener having a loop portion permanently affixed to an upper surface of the support and a hook portion passing through openings in a central portion of the support and wrapped around portions of the motorcycle, including its luggage rack, sissy bar and other portions, for example.

It is yet another object of the present invention to provide a touring bag support to be mounted on a luggage rack of a motorcycle by a hook and loop fastener having a loop portion permanently affixed to an upper surface of the support and a hook portion passing through openings in a central portion of the support and wrapped around portions of the motorcycle, including its luggage rack, sissy bar and other portions, for example, and having a plurality of spaced openings about the periphery of the front and side edges of the support for securing one end of a bungee cord with the opposite end being secured to the touring bag.

It is still yet another object of the present invention to provide a touring bag support to be mounted on a luggage rack of a motorcycle by a hook and loop fastener having a loop portion permanently affixed to an upper surface of the support and a hook portion passing through openings in a central portion of the support and wrapped around portions of the motorcycle, including its luggage rack, sissy bar and other portions, for example, and having a plurality of spaced openings about the periphery of the front and side edges of the support for securing one end of a bungee cord with the opposite end being secured to the touring bag and having two openings along a rear edge portion for receipt of a touring bag strap having a clip at one end and a buckle at an opposite end so as to wrap the strap through and around the support for connection of the buckle and clip so as to tightly secure the touring bag to the support.

It is still yet a further object of the present invention to provide a touring bag support to be mounted on a luggage rack of a motorcycle by a hook and loop fastener having a loop portion permanently affixed to an upper surface of the support and a hook portion passing through openings in a central portion of the support and wrapped around portions of the motorcycle, including its luggage rack, sissy bar and other portions, for example, and having a plurality of spaced openings about the periphery of the front and side edges of the support for securing one end of a bungee cord with the opposite end being secured to the touring bag and having two openings along a rear edge portion for receipt of a touring bag strap having a clip at one end and a buckle at an opposite end so as to wrap the strap through and around the support for connection of the buckle and clip so as to tightly secure the touring bag to the support with the support having overall dimensions of eleven inches wide by nineteen inches long, and preferably one inch wider and one inch longer than a base portion of a touring bag.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
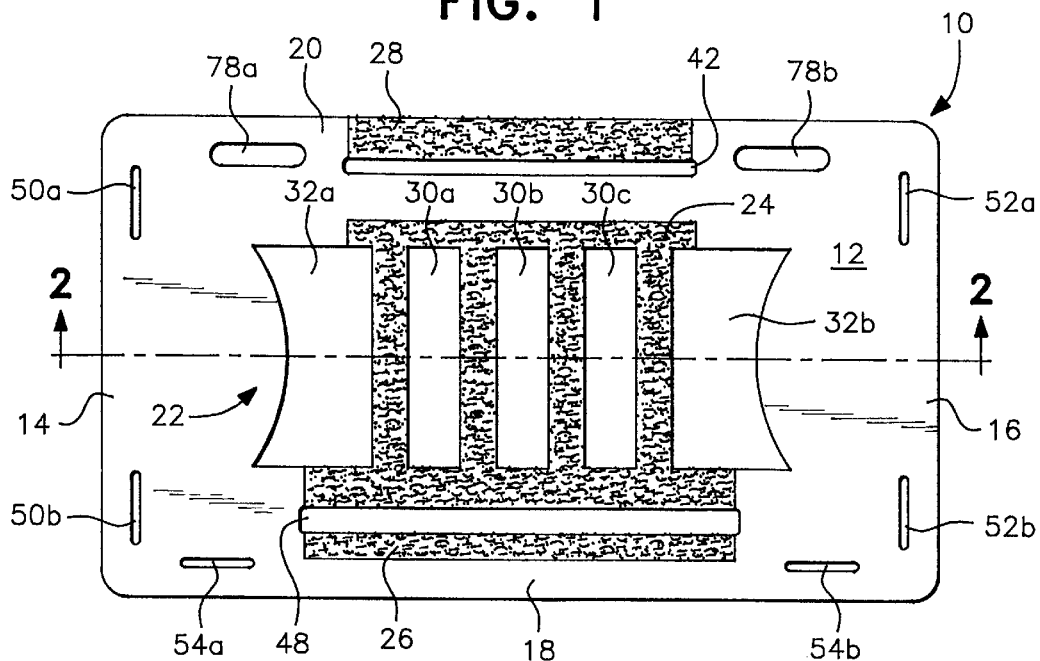
FIG. 1 is a plan view of a motorcycle touring bag support of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
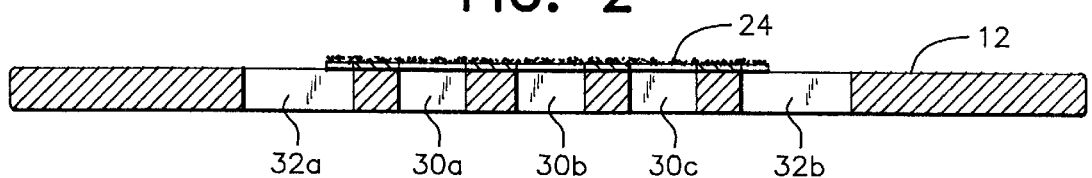
FIG. 2 is a cross sectional view taken along line 2—2 of FIG. 1.

With reference to the drawings, in general, and to FIGS. 1 and 2, in particular, a touring bag support plate embodying the teachings of the subject invention is generally designated as 10. With reference to its orientation in FIG. 1, the touring bag support plate includes an upper surface 12, opposed side edge portions 14, 16, front edge portion 18, rear edge portion 20 and central portion 22.

The touring bag support plate 10 has a front edge portion 18 to rear edge portion 20 width of approximately 11 inches and a length between opposed side edge portions 14, 16 of approximately 19 inches. The support plate 10 preferably has a thickness of ¼ to ¾ of an inch, and more preferably a thickness of ½inch.

At various locations spaced across the upper surface 12 of the support plate 10 are located sections 24, 26, 28 of loop portions of a hook and loop fastener. Inter-dispersed in the loop fastener section 24 are three rectangular openings 30a, 30b, 30c. In addition, two additional laterally located openings 32a, 32b are located in central portion 22.

Figure 3:
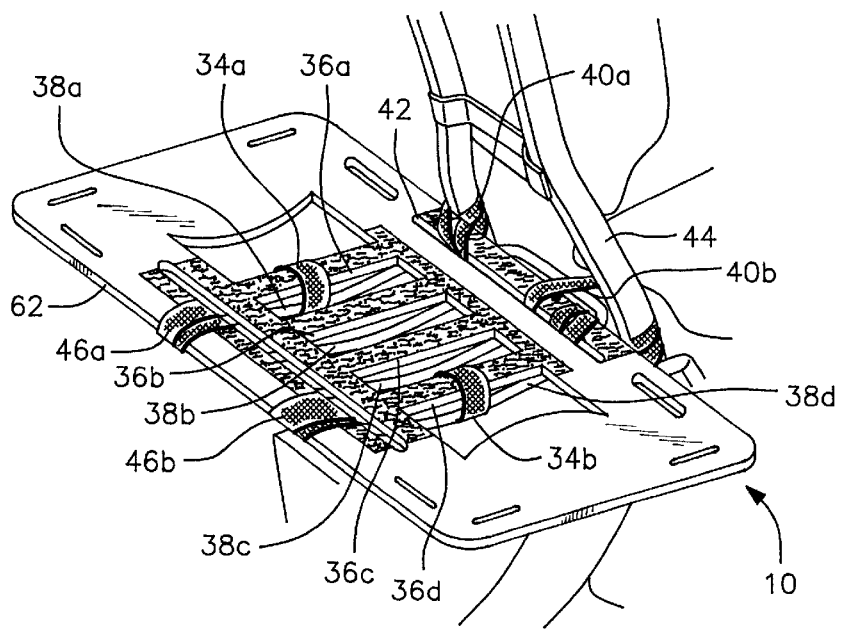
FIG. 3 is a perspective view illustrating the mounting of the touring bag support of the present invention on top of a luggage rack of a motorcycle.

As shown in FIG. 3, straps 34a, 34b, including hook fastener portions of a hook and loop fastener, are wrapped around two of the bars 36a, 36b, 36c or 36d which are formed between the openings formed between openings 32a and 30a, openings 30a and 30b, openings 30b and 30c and between openings 30c and 32b. The straps 34 extend around the bars 38a, 38b, 38c or 38d of the luggage rack of a motorcycle. The hook portions of the straps 34a, 34b are rigidly secured to the loop portion section 24.

Similarly, straps 40a, 40b extend through an elongated rectangular opening 42 at the rear edge portion 20 of the support as shown in FIG. 3. The straps 40a, 40b are wrapped around sissy bar 44 and rigidly secured to the loop fastener portion 28 so as to additionally secure the support plate 10 to the motorcycle luggage rack.

Additional connection of the support plate 10 to the motorcycle luggage rack is provided by straps 46a, 46b passing through elongated rectangular opening 48 at front edge portion 18. The hook fastener portion on the straps 46a, 46b are secured to loop fastener section 26 so as the anchor the support plate to additional anchoring points on a motorcycle.

Located on each of side edges portions 14, 16 and front edge portion 18 are two rectangular shaped slots 50a, 50b, 52a, 52b and 54a, 54b. Each slot is approximately ¼ inch wide and approximately ½ inches long.

Figure 4:
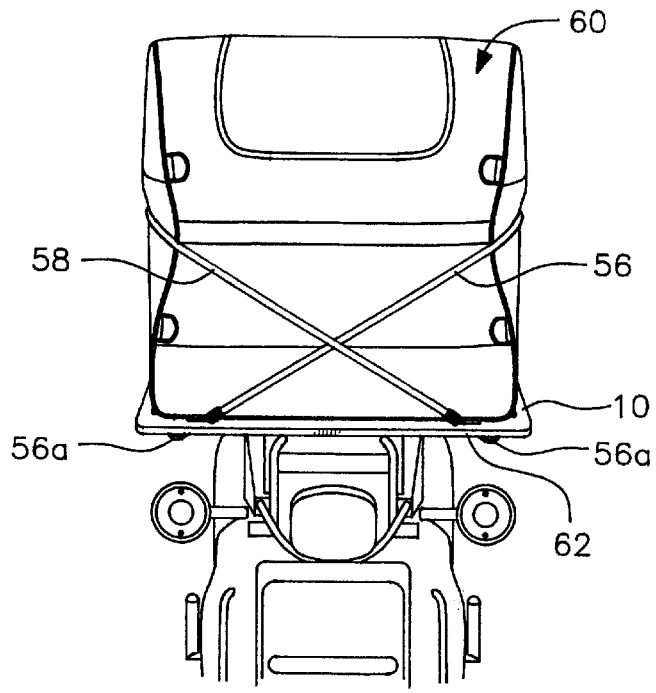
FIG. 4 is a rear view of a touring bag securely mounted on top of the touring bag support of the present invention as mounted on a motorcycle.
Figure 5:
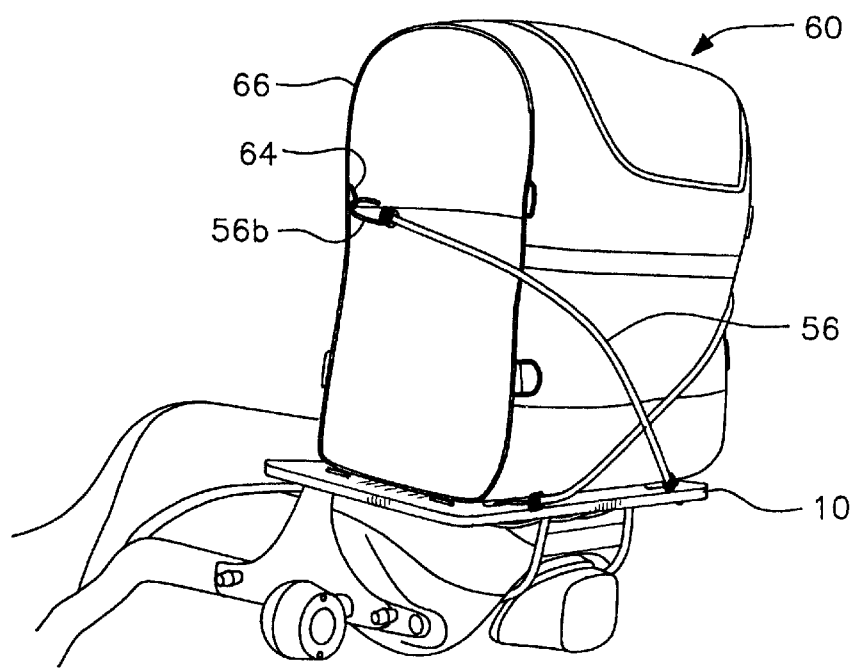
FIG. 5 illustrates the interconnection of opposite ends of a bungee cord between the touring bag support of the present invention and D-rings mounted along seam edges of a touring bag.

As shown in FIGS. 4 and 5, two bungee cords 56, 58 are used to secure a motorcycle touring bag 60 to the touring bag support plate 10. One end 56a of bungee cord 56 is inserted through slot 54b and rotated to extend over front edge 62 of the support plate 10. This anchors end 56a of bungee cord 56 in place. The opposite end 56b, as shown in FIG. 5, is passed to extend through a D-ring 64 which is secured on a seam 66 of touring bag 60. Similarly, end 56a of bungee cord 56 is passed through slot 54a and the opposite end (not shown) is secured to a D-ring on the opposite side of the touring bag 60.

Figure 6:
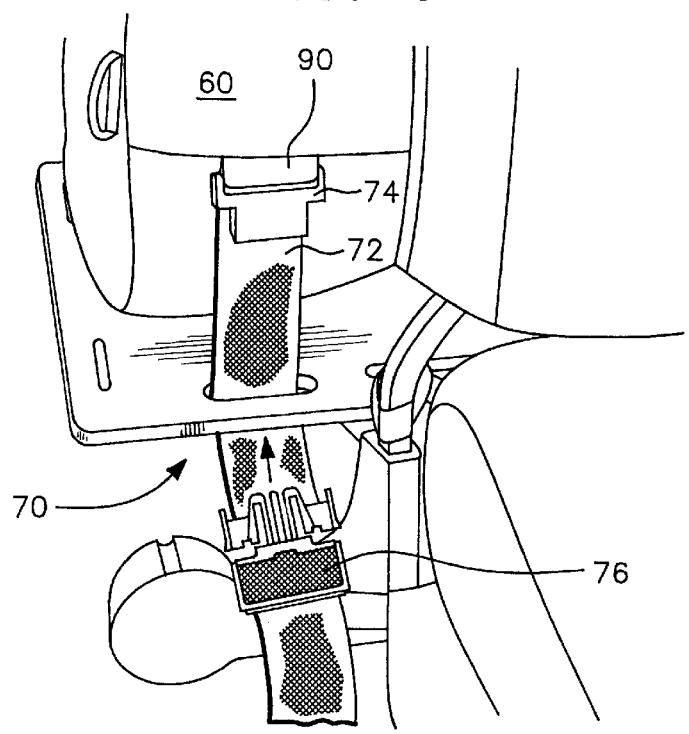
FIG. 6 is an enlarged partial view of the mounting of a touring bag support of the present invention with a touring bag strap secured to the touring bag having a clip at the end of a strap passing through an opening in the touring bag support.
Figure 7:
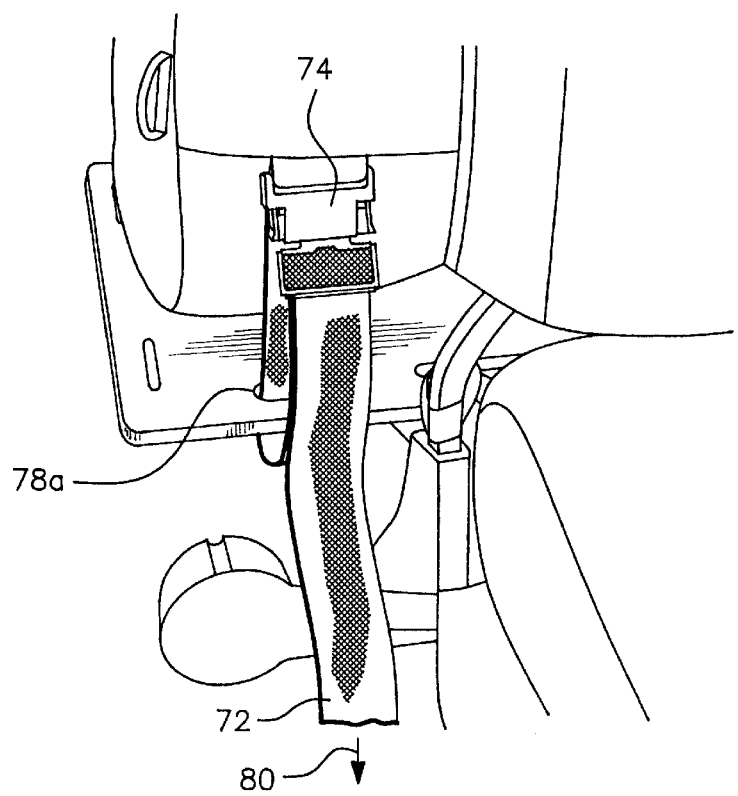
FIG. 7 shows the interconnection of a clip at the end of a touring bag strap being secured to a buckle mounted on the touring bag for subsequent cinching of the strap and rigid anchoring of the touring bag on the touring bag support.

Most touring bags, as shown in FIGS. 6 and 7, include a touring bag strap assembly 70 including a strap 72 terminating in a buckle 74 anchored to the touring bag 60 by the webbing 90. The opposite end of the strap is threaded through the clip 76 which is adjustably mounted on the strap. Clip 76 is fed downwardly through one of the openings 78a, 78b located in the rear edge portion 20 of the support. Openings 78a, 78b are approximately ½ inch wide and approximately 2 inches long so as to provide passage therethrough of the clip 76.

After the clip 76 is passed through the opening 78a as shown in FIG. 7, it is connected to the buckle 74 and the strap tightened by pulling the strap 72 in the direction of arrow 80. A similar securing of a touring bag strap is done on the opposite side of the touring bag (not shown) by passage through opening 78b in the support plate 10.

The touring bag support plate of the present invention provides numerous openings for securing the support plate to a motorcycle luggage rack as well as for securing a touring bag to the support plate.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A touring bag support for mounting on a luggage rack of a motorcycle and for supporting a motorcycle touring bag on top of the touring bag support, said touring bag support comprising:

a rigid plate having an upper surface, a front edge portion, a rear edge portion, opposed side edge portions and a central portion, one of a hook fastener and a loop fastener being secured on said upper surface, a plurality of openings located in said central portion, the other of said hook fastener and said loop fastener extending through said plurality of openings and connected to said one of said hook fastener and said loop fastener for securing said rigid plate to the motorcycle, and at least one slot located in at least one of said front edge portion, said rear edge portion and one of said side edge portions.

2. A touring bag support as claimed in claim 1, wherein an elongated opening is located in said front edge portion and said rear edge portion.

3. A touring bag support as claimed in claim 2, wherein said elongated opening of said front edge portion is parallel to said elongated opening of said rear edge portion.

4. A touring bag support as claimed in claim 1, wherein said one of said hook fastener and said loop fastener is located in said central portion.

5. A touring bag support as claimed in claim 1, wherein said rigid plate is approximately 11 inches wide and approximately 19 inches long.

6. A touring bag support as claimed in claim 1, wherein additional of said one of said hook fastener and said loop fastener in located at said rear edge portion.

7. A touring bag support as claimed in claim 1, wherein additional of said one of said hook fastener and said loop fastener is located at said front edge portion.

8. A touring bag support as claimed in claim 1, wherein two of said slots are located at said front edge portion for receiving one end of two bungee cords, respectively.

9. A touring bag support as claimed in claim 1, wherein said rear edge portion includes two openings for securing a touring bag by touring bag straps to said rigid plate.

10. A touring bag support as claimed in claim 1, wherein said plurality of openings comprise at least three openings located in said central portion.

11. A touring bag support for mounting on a luggage rack of a motorcycle and for supporting a motorcycle touring bag on top of the touring bag support, said touring bag support, comprising:

a rigid plate having an upper surface, a front edge portion, a rear edge portion, opposed side edge portions and a central portion, a hook fastener and a loop fastener for securing the plate to a motorcycle, one of said hook fastener and said loop fastener being secured on said upper surface, a plurality of openings located in said central portion, the other of said hook fastener and said loop fastener extending through said plurality of openings and connected to said one of said hook fastener and said loop fastener for securing said rigid plate to the motorcycle, and said plate including at least two slots for respectively receiving ends of bungee cords.

12. A touring bag support as claimed in claim 11, wherein an elongated opening is located in said front edge portion and said rear edge portion.

13. A touring bag support as claimed in claim 12, wherein said elongated opening of said front edge portion is parallel to said elongated opening of said rear edge portion.

14. A touring bag support as claimed in claim 11, wherein said one of said hook fastener and said loop fastener is located in said central portion.

15. A touring bag support as claimed in claim 11, wherein said rigid plate is approximately 11 inches wide and approximately 19 inches long.

16. A touring bag support as claimed in claim 11, wherein additional of said one of said hook fastener and said loop fastener is located at said rear edge portion.

17. A touring bag support as claimed in claim 11, wherein additional of said one of said hook fastener and said loop fastener is located at said front edge portion.

18. A touring bag support as claimed in claim 11, wherein said rear edge portion includes two openings for securing a touring bag by touring bag straps to said rigid plate.

19. A touring bag support as claimed in claim 11, wherein said plurality of openings comprise at least three openings located in said central portion.

* * * * *